United States Patent
Aharon et al.

(10) Patent No.: US 7,990,379 B2
(45) Date of Patent: Aug. 2, 2011

(54) SYSTEM AND METHOD FOR CORONARY SEGMENTATION AND VISUALIZATION

(75) Inventors: Shmuel Aharon, West Windsor, NJ (US); Mehmet Akif Gulsun, Lawrenceville, NJ (US); Huseyin Tek, Princeton, NJ (US)

(73) Assignee: Siemens Aktiengesellschaft, München ( * ) Notice: Subject to any disclaimer, the term of this patent is extended or adjusted under 35 U.S.C. 154(b) by 944 days.

(21) Appl. No.: 11/870,546

(22) Filed: Oct. 11, 2007

(65) Prior Publication Data

US 2008/0100621 A1     May 1, 2008

Related U.S. Application Data

(60) Provisional application No. 60/854,183, filed on Oct. 25, 2006.

(51) Int. Cl.
*G06T 17/00* (2006.01)
(52) U.S. Cl. ........ 345/424; 345/419; 345/420; 345/427; 345/441; 345/442; 382/128; 382/130; 382/131; 382/173; 600/410; 703/11
(58) Field of Classification Search .......... 345/419, 345/420, 424, 440, 442, 427, 441; 382/128, 382/131, 170, 173, 120, 130; 600/410
See application file for complete search history.

(56) References Cited

U.S. PATENT DOCUMENTS

| | | | |
|---|---|---|---|
| 6,583,787 B1 * | 6/2003 | Pfister et al. | 345/441 |
| 6,639,597 B1 * | 10/2003 | Zwicker et al. | 345/427 |
| 7,397,935 B2 * | 7/2008 | Kimmel et al. | 382/128 |
| 7,596,267 B2 * | 9/2009 | Accomazzi et al. | 382/173 |
| 7,773,792 B2 * | 8/2010 | Kimmel et al. | 382/128 |
| 7,783,091 B2 * | 8/2010 | Rinck et al. | 382/128 |
| 2006/0142984 A1 * | 6/2006 | Weese et al. | 703/11 |
| 2007/0047792 A1 * | 3/2007 | Scheuering et al. | 382/128 |
| 2007/0160274 A1 * | 7/2007 | Mashiach | 382/128 |
| 2007/0263915 A1 * | 11/2007 | Mashiach | 382/130 |
| 2008/0205722 A1 * | 8/2008 | Schaefer et al. | 382/128 |
| 2008/0273777 A1 * | 11/2008 | Luboz et al. | 382/130 |
| 2009/0136103 A1 * | 5/2009 | Sonka et al. | 382/128 |

OTHER PUBLICATIONS

Wink et al. "3D MRA Coronary Axis Determination Using a Minimum Cost Path Approach", Published 2002.*

Weichert et al. "Virtual 3D IVUS vessel model for intravascular brachytherapy planning. I. 3D segmentation, reconstruction, and visualization of coronary artery architecture and orientation". Sep. 20003.*

* cited by examiner

*Primary Examiner* — Kimbinh T Nguyen
(74) *Attorney, Agent, or Firm* — Donald B. Paschburg; F. Chau & Associates, LLC (57) ABSTRACT

A method of coronary vessel segmentation and visualization includes providing a digitized coronary image, placing a plurality of seed points along an estimated centerline of a coronary vessel, selecting a seed point and constructing a cyclic graph around the seed point in a plane perpendicular to the centerline at the seed point, performing a multi-scale-mean shift filtering in the perpendicular plane to estimate image gradient values, detecting a vessel boundary using a minimum-mean-cycle optimization that minimizes a ratio of a cost of a cycle to a length of a cycle, constructing a sub-voxel accurate vessel boundary about a point on the centerline, and refining the location of the centerline point from the sub-voxel accurate boundary, where the steps of constructing a sub-voxel accurate vessel boundary and refining the centerline point location are repeated until convergence.

30 Claims, 9 Drawing Sheets

SYSTEM AND METHOD FOR CORONARY SEGMENTATION AND VISUALIZATION

CROSS REFERENCE TO RELATED UNITED STATES APPLICATIONS

This application claims priority from "Advanced Coronary Visualization and Segmentation", U.S. Provisional Application No. 60/854,183 of Aharon, et al., filed Oct. 26, 2006, the contents of which are herein incorporated by reference.

TECHNICAL FIELD

This disclosure is directed to the visualization and segmentation of multi-branched coronary vessels.

DISCUSSION OF THE RELATED ART

Non-invasive diagnosis of coronary artery pathologies has become a reality due to the technological advances in image acquisition devices such as the introduction of multi-detector computed tomography (CT). While these advances have significantly improved image quality, the diagnosis of such pathologies still requires advanced segmentation, quantification and visualization algorithms. There are many cross-sectional vessel segmentation algorithms known in the art. However, most of these approaches are not suited for coronary vessels, especially when the seed point falls near or outside of a vessel boundary. Accurate segmentation of coronary arteries is challenging since the physical size of the coronary vessels is quite small and is sensitive to noise and partial volume effects. Effective visualization of the segmented coronaries is also challenging to achieve. For example, a direct three-dimensional (3D) surface rendering may involve the risk of obliterating stenoses. Furthermore, this rendering technique completely masks out of the image the area surrounding these vessels. This lack of surrounding area information significantly reduces the effectiveness of the visualization, and obscures the exact location and orientation of the visualized vessels.

Accurate and robust detection of vessel boundaries is another challenging task. In particular, a vessel boundary detection algorithm should be accurate and robust so that the algorithm can be used to accurately detect vessel boundaries on many types of medical images. If the vessel boundary detection algorithm is inaccurate, even in a small number of cases, a medical professional (e.g., a radiologist) relying on the computer's output may, in turn, incorrectly diagnose the patient.

There are many reasons why accurate and robust detection of vessel boundaries is a challenging task. First, the presence of significant noise levels in computed tomography (CT) and magnetic resonance (MR) images often forms strong edges, i.e. changes in intensity between data points, inside vessels. Second, the size of a vessel can vary from one vessel location to another, resulting in additional edges. Third, the intensity profile of a vessel boundary can be diffuse on one side while shallow on the other sides, due to, e.g., the presence of other vessels or high contrast structures. Fourth, the presence of vascular pathologies, such as calcified plaques, often makes the shape of a vessel cross-sectional boundary locally deviate from a circular shape. These all result in additional edges that can affect an accurate determination of a vessel boundary.

SUMMARY OF THE INVENTION

Exemplary embodiments of the invention as described herein generally include methods and systems for accurate segmentation and advanced visualization of multi-branched vessels. A method according to an embodiment of the invention finds a closed contour in this graph that corresponds to the vessel cross-sectional boundaries. To obtain a vessel boundary from a minimum mean cycle optimization algorithm, a plurality of cyclic graphs are constructed around a seed point of interest, including a cycle corresponding to the vessel boundary. A cyclic graph is constructed by propagating a plurality of rays from the seed point and connecting these rays with multiple edges. A cost (weight) value is assigned to graph edges to apply the optimization algorithm. The weights of the graph edges are computed from image gradients or image edges. A typical cross-sectional vessel boundary is smooth, similar to an ellipse with possible local deviations, and encloses a seed point obtained from a vessel path.

The input to the segmentation part of an algorithm according to an embodiment of the invention is the centerline tree of multi-branched vessels. These centerline models can be recursively computed and refined using cross-sectional boundary detection. A triangular mesh structure that represents the multi-branched tree can be built using these accurate centerline models. Therefore, the actual segmented shape is used for the visualization. The actual segmentation is based on an iterative 2D vessel cross-sectional segmentation and centerline refinement algorithm.

Methods and systems according to an embodiment of the invention include methods for simultaneous projection of multi-branched vessels and their surrounding context on a single image, methods for Ribbon MPR along the segmented vessels, with and without expanding the ribbon MPR with its surrounding area, and methods for rendering of the vessels by displaying their Mean-Shift values instead of MIP or the data grayscale values. According to various embodiments of the invention, these algorithms can be implemented using either the OpenGL or DirectX APIs.

According to an aspect of the invention, there is provided a method for coronary vessel segmentation and visualization, including providing a digitized coronary image, the image comprising a plurality of intensities associated with a 3-dimensional grid of voxels, placing a plurality of seed points along an estimated centerline of a coronary vessel, selecting a seed point and constructing a cyclic graph around the seed point in a plane perpendicular to the centerline at the seed point, performing a multi-scale-mean shift filtering in the perpendicular plane to estimate image gradient values, detecting a boundary of the vessel using a minimum-mean-cycle optimization that minimizes a ratio of a cost of a cycle in the graph to a length of the cycle, constructing a sub-voxel accurate vessel boundary about a point on the centerline, and refining the location of the centerline point from the sub-voxel accurate boundary, wherein the steps of constructing a sub-voxel accurate vessel boundary and refining the centerline point location are repeated until convergence.

According to a further aspect of the invention, the steps of selecting a seed point and constructing a cyclic graph, estimating image gradient values, and detecting a vessel boundary are repeated for each of the plurality of seed points, and further comprising constructing a 3-dimensional triangulated surface model from the sub-voxel accurate vessel boundaries to form a tubular mesh representing the coronary vessel, and rendering the tubular mesh from a viewer-specified direction.

According to a further aspect of the invention, constructing a cyclic graph around the seed point comprises disposing an array of nodes are disposed at step at equally spaced angular intervals about each one of a circumference of plurality of concentric circles centered at the seed point; and for each node in the graph, extending a plurality of edges to other nodes in the graph, wherein an angle of each edge termination node with respect to the seed point is greater than the angle of the edge origination node with respect to the seed point.

According to a further aspect of the invention, the plurality of edges comprises 3 edges.

According to a further aspect of the invention, performing a multi-scale-mean shift filtering comprises propagating one or more rays along the vessel, representing each ray as a collection of 2-dimensional points, performing a mean-shift filtering to each 2D points until convergence, selecting a plurality of edges based on a confidence function of the mean-shift filter size, and eliminating incorrect edges.

According to a further aspect of the invention, the confidence function for a filter scale $\sigma_{xk}$ at a point i is given by:

$$E_{ci}(\sigma_{xk}) = \frac{\sum_{j=1}^{M} \frac{|I_j^* - I_i|}{|I_c - I_i|}}{M}$$

where M is a size of the filter, $I_j^*$ is a smoothed intensity at j, and $I_c$ corresponds to the intensity value of the mean-shift convergence point.

According to a further aspect of the invention, eliminating incorrect edges comprises eliminating those edges with a small confidence value.

According to a further aspect of the invention, constructing a 3-dimensional triangulated surface model comprises, for each successive vessel boundary, sampling one boundary, locating corresponding points on a next boundary, and constructing a triangulated surface by connecting each point on the sampled boundary to two closest points on the next boundary.

According to a further aspect of the invention, rendering the tubular mesh comprises specifying a less-than Z-buffer for the tubular mesh wherein every visible point in the resulting Z-buffer specifies the distance, along a viewing direction, from a viewer to a nearest visible part of the tubular mesh, generating a set of two-dimensional points by extracting all Z-buffer points that are on a boundary between visible and non-visible parts of the tubular mesh, generating a triangular mesh from the set of two-dimensional points, projecting the triangular mesh into a 3-dimensional space by adding to each point of the mesh a Z coordinate calculated from a corresponding less-than Z-buffer function value and a known model-view transformation of the specific viewing direction, creating a complete Z-buffer representation of the projected 3-dimensional triangular mesh representing the vessels by adding near-plane Z-buffer values of the projected 3-dimensional triangular mesh to corresponding non-visible points of the less-than Z-buffer function, and volume rendering the 3-dimensional triangular mesh by calculating ray starting points and direction from the complete Z-buffer values and the specified viewing direction.

According to a further aspect of the invention, the rays are propagated to a specified depth in the 3-dimensional triangular mesh.

According to a further aspect of the invention, the method includes generating a far Z-plane to provide an exit point for each ray.

According to a further aspect of the invention, extracting all Z-buffer points that are on a boundary between visible and non-visible parts of the tubular mesh comprises checking, for every visible point in the Z-buffer, whether or not all neighboring points are visible, skipping to a next pixel if all the neighbors are visible, otherwise if there is at least one non-visible neighbor point, mark this point as a boundary between visible and non-visible points; and adding additional points at corners of the Z-buffer according to a desired bounding box of an image area to be visualized.

According to a further aspect of the invention, the volume rendering is performed using calculated mean-shift values of each point in the mesh, wherein an intensity value at each point is replaced with a local intensity of a mode obtained from the mean shift computation, wherein a mean-shift value of a triangle in the mesh is determined from an average value of the mean-shift values at the corners computed from a 1D mean-shift computation at each location.

According to another aspect of the invention, there is provided a program storage device readable by a computer, tangibly embodying a program of instructions executable by the computer to perform the method steps for coronary vessel segmentation and visualization.

DETAILED DESCRIPTION OF EXEMPLARY EMBODIMENTS

Exemplary embodiments of the invention as described herein generally include systems and methods for visualization and segmentation of multi-branched coronary vessels. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

2D Vessel Cross-Sectional Segmentation

An algorithm according to an embodiment of the invention uses a minimum mean cycle optimization on directed graphs for the vessel cross-sectional boundary detection. Such an algorithm is stable to the location of the seed point as well as stable to image noise. A minimum mean cycle algorithm involves finding a cycle or contour in a graph such that its average cost is a minimum. The average cost of a cycle is simply the ratio of the sum of all edge weights on the cycle to its length, the number of edges on the cycle. Mathematically, let G=(V,E) be a digraph with n vertices (V) and m weighted edges (E). A cycle, C on G is a path that is a subset of edges such that the first node is the last. The total cost and length of a cycle is the sum of weights, w(C) and sum of lengths, |C| of edges on that cycle, respectively. A minimum mean cycle algorithm minimizes the ratio of total cost of the cycle to its length, w(C)/|C|.

Figure 1A:
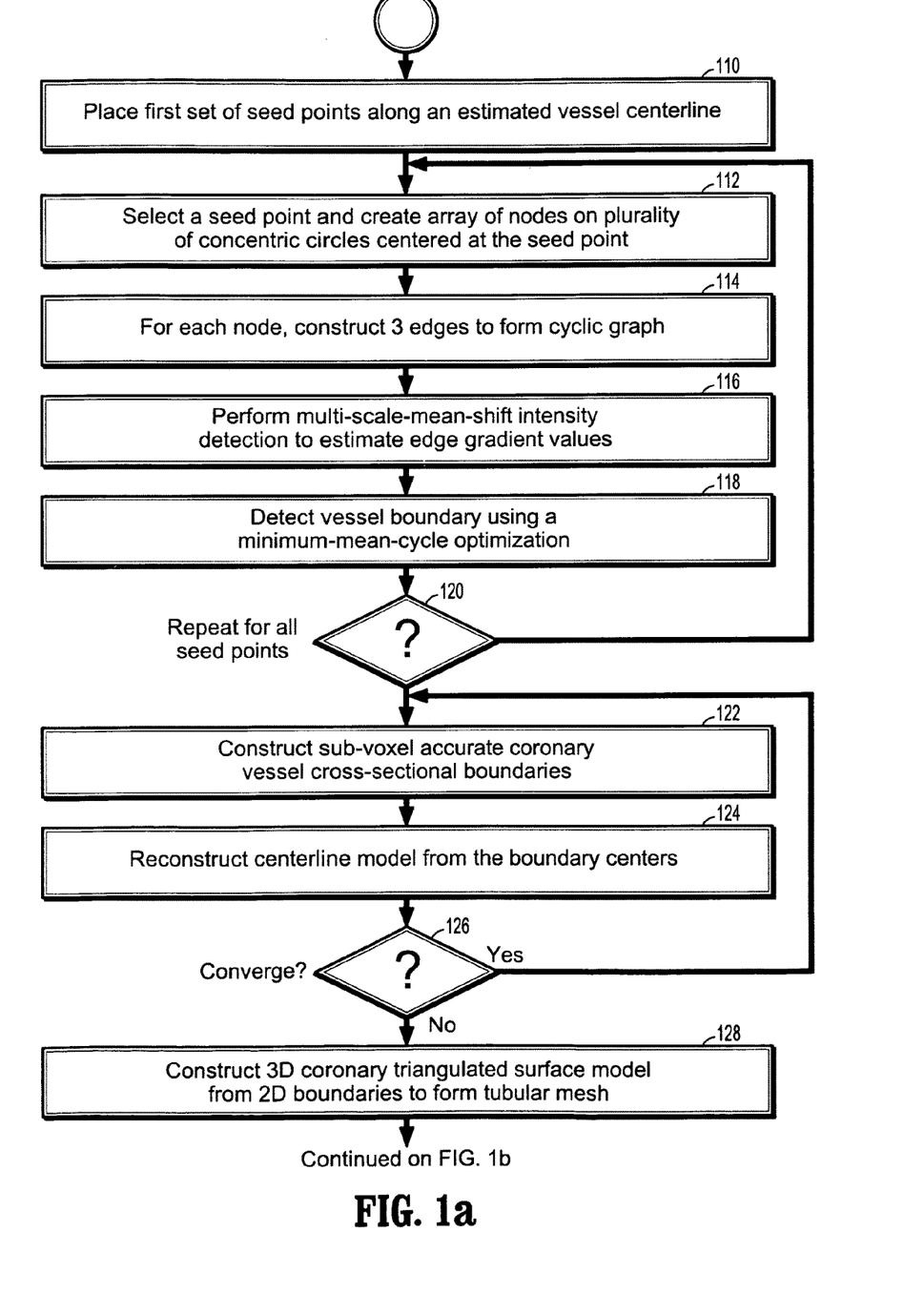
FIGS. 1a-b is a flowchart of an algorithm for visualization and segmentation of multi-branched coronary vessels, according to an embodiment of the invention.

FIG. 1a is a flowchart of a method for finding a closed contour in a graph that corresponds to the vessel cross-sectional boundaries, according to an embodiment of the invention. Referring to the figure, at step 110, given an image, a first set of seed points is placed to create an initial centerline of the vessel. Alternatively, an estimate of the centerline may be obtained from a segmentation algorithm or other centerline extraction technique.

Figure 2:
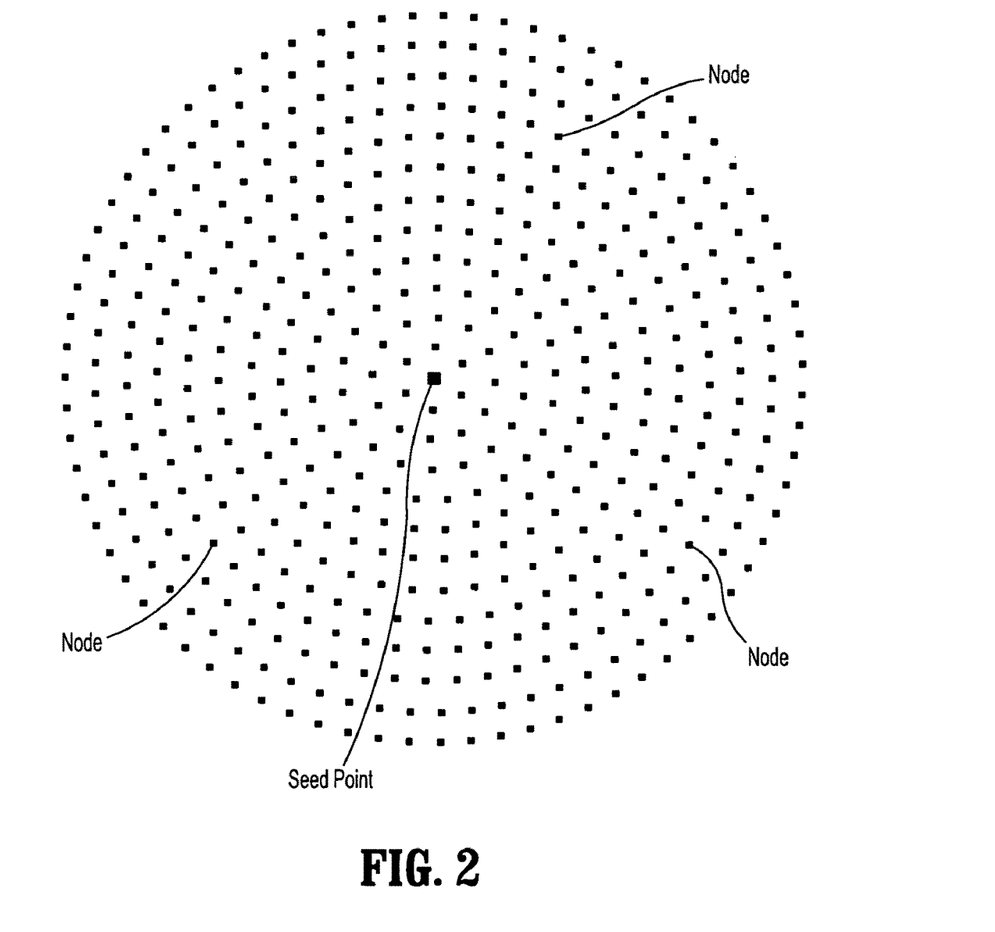
FIG. 2 illustrates an exemplary array of nodes in a plane, according to an embodiment of the invention.
Figure 3:
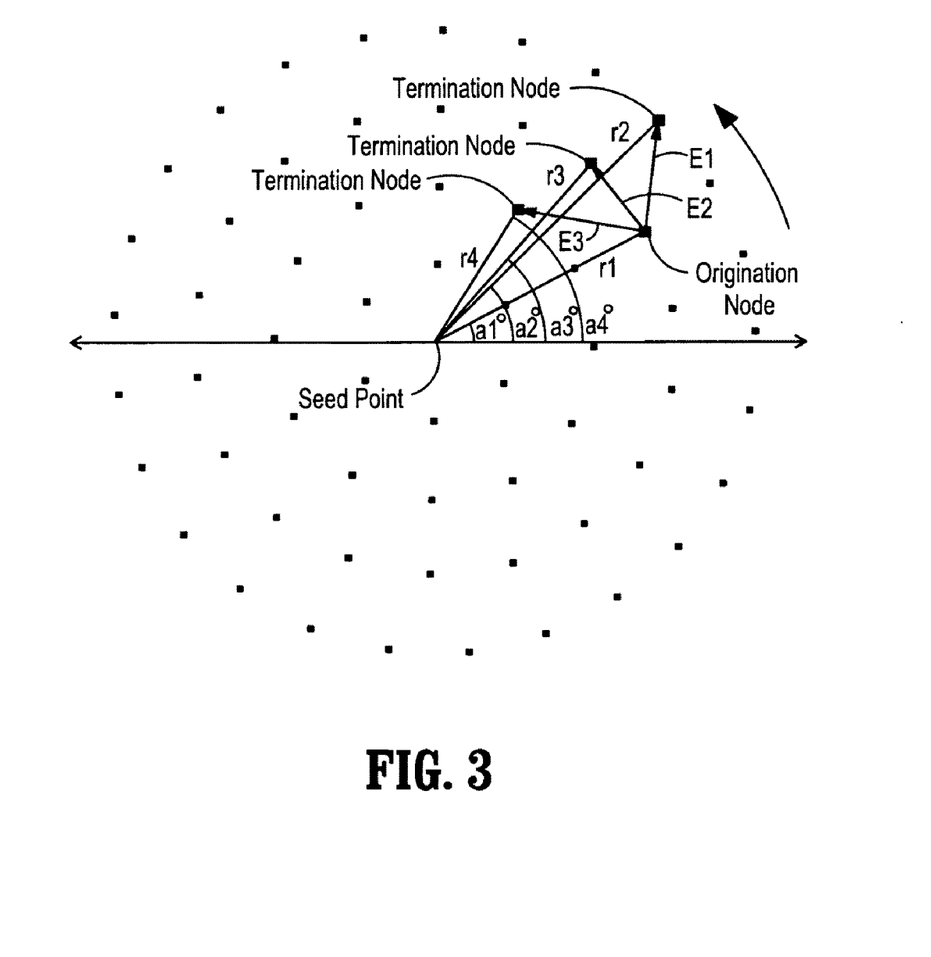
FIG. 3 illustrates the construction of 3 edges from an origination node, according to an embodiment of the invention.
Figure 4:
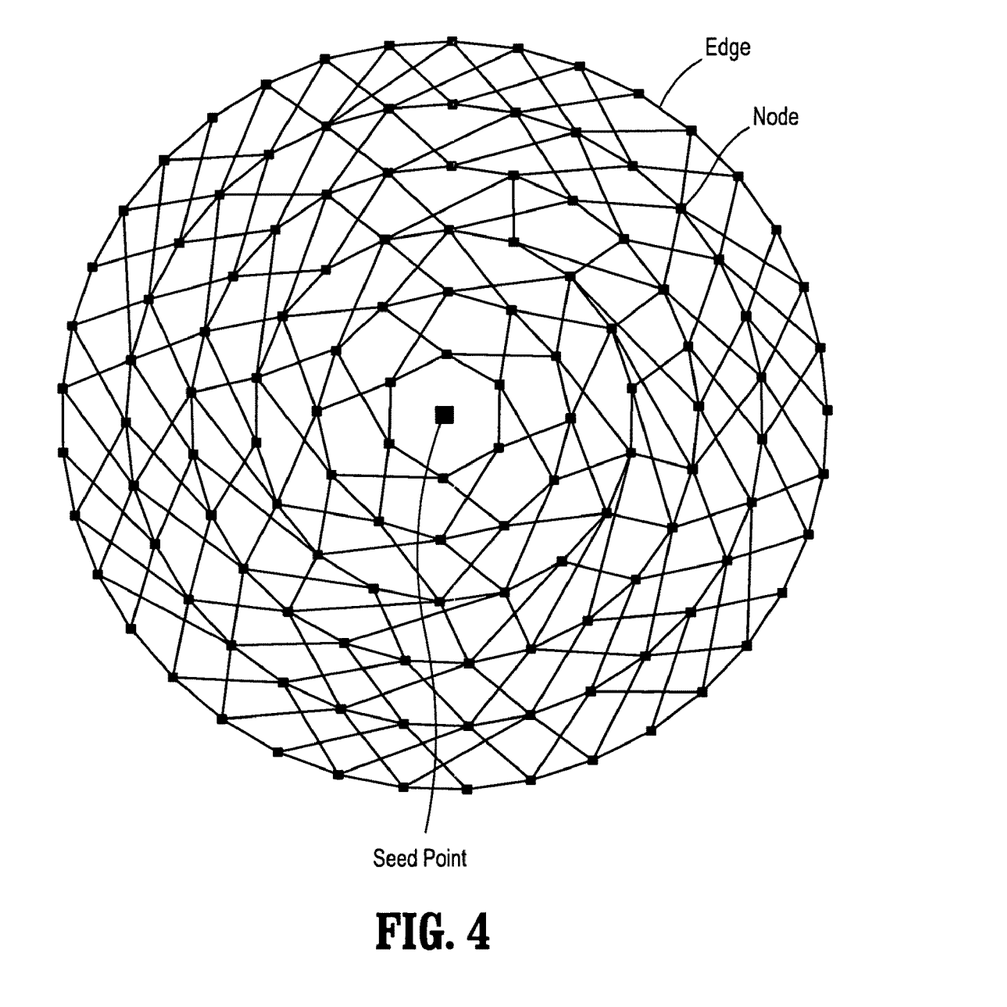
FIG. 4 illustrates an exemplary completed graph built from the edge construction technique of FIG. 3, according to an embodiment of the invention.

Next, a seed point is selected and a cyclic graph is constructed around the selected seed point in a plane thru the seed point perpendicular to the centerline. An array of nodes are disposed at step 112 at equally spaced intervals about each one of a circumference of plurality of concentric circles centered at the seed point. The nodes are arranged at regular angles in the concentric circles. An exemplary array of nodes in a plane is illustrated in FIG. 2. Each node has a unique radius and angular deviation from a reference axis, in a polar coordinate system centered at the seed point. Referring to FIG. 1a, at step 114, for each node, a plurality of edges are extended to other nodes. According to a non-limiting embodiment of the invention, there are 3 edges in the plurality of edges. FIG. 3 illustrates the construction of 3 edges from an originating node. The edges begin at the origination node r1 and terminate at 3 termination nodes r2, r3, r4 closest to r1 satisfying the following conditions: the termination nodes must be positioned at angles with respect to the seed point greater than the angle of the origination node r1. That is, for origination node r1 having angle a1 and termination nodes r2, r3, r4 with respective angles a2, a3, a4, each of a2, a3, and a4 is greater than a1. The termination nodes have polar coordinates (r2, a2), (r3, a3), and (r4, a4). The edges are constructed from the origination node r1 to each of the 3 termination nodes r2, r3, r4. Specifically, edge e1 connects r1 to r2, edge e2 connects r1 to r3, and edge e3 connects r1 to r4. An exemplary graph built from this technique is illustrated in FIG. 4.

The cost of edges is typically determined as a function of the image gradients. Referring again to FIG. 1a, at step 116, a filtering operation, such as multi-scale-mean-shift intensity detection, is applied orthogonal to the cyclic graph edges to estimate the gradient value of the edges in the plane perpendicular to the first centerline estimate. The edge weights are inverses of the image gradients.

The vessel boundary is detected at step 118 using a minimum-mean-cycle optimization operating on the cyclic graph edge weights. The total cost and length of a cycle is the sum of weights, w(C) and sum of lengths, |C| of edges on that cycle, respectively. The minimum mean cycle optimization minimizes the ratio of total cost of the cycle to its length, w(C)/|C|.

The boundary detection process steps 112, 113, 114, and 115 are repeated at step 120 for each one of the seed points until all of first set of seed points along the centerline have been processed. A surface of the vessel can be produced from the final boundaries.

A mean-shift analysis such as that applied at step 116 applies spatial filters along 1D rays at many size scales. Specifically, a 1-dimensional intensity profile (ray) is obtained from a gray level image. Each pixel along the ray is characterized by a location x and an intensity value I. As a result, an input ray of N pixels is represented as a collection of 2-dimensional points $\{x_i, I_i\}$. The 2-dimensional space constructed as before is called the joint spatial-intensity domain. Then, mean shift filtering is applied to this joint domain. The output of the mean-shift filter includes a displacement vector $\{d_i\}$ which measures the spatial movement of each spatial point. In this algorithm, each point in this spatial-range domain is processed via the mean shift operator until convergence. The existence of the seed point defines the inner part of the structure, so that the gradient computation can be performed orthogonal to the edges. In other words, a sample is taken from the ray orthogonal to the edge, and multi-scale edge detection is performed along this edge.

According to a mean-shift analysis of an embodiment of the invention, edges are detected based on the change in intensity between data points over a plurality of distances. In one embodiment, edges are detected by propagating one or more rays along the vessel. A set of edges is then selected from the detected edges. Each edge in the selected set of edges can be selected based on its strength. The intensity data can be locally clustered around the edge by the mean-shift, if the proper scale, $\sigma_x$, is chosen. The local clustering is used to define the edge confidence. The edge confidence measures the validity of an edge by checking the presence of local clustering. Edge confidence for scale ($\sigma_{xk}$) at location i is given by:

$$E_{ci}(\sigma_{xk}) = \frac{\sum_{j=1}^{M} \frac{|I_j^* - I_i|}{|I_c - I_i|}}{M}$$

where M is the size of the filter, $I_j^*$ is a smoothed intensity at j, and $I_c$ corresponds to the intensity value of the convergence point, i.e., the local intensity mode. This measure is close to one if a local clustering forms around the edge and otherwise close to zero. Next, incorrect edges can be eliminated from the edges. Edges with small confidence (e.g., <0.4) are deleted. Convergence locations correspond to the spatial locations where the displacement vectors terminate after mean-shift filtering.

A minimum cycle mean $\lambda^*$ of a graph G=(V, E), such as that calculated at step 118, can be defined as the optimum value of $\lambda$ in the following linear program:

$$\max \lambda \text{ s.t. } d(v) - d(u) \leq w(u,v) - \lambda, \forall (u,v) \in E,$$

where d(v) is called the distance (or the node potential) of v. When the inequalities are all satisfied, d(v) is equal to the weight of the shortest path from a node s to v in G when $\lambda^*$ is subtracted from every edge weight, where node s is arbitrarily chosen as the source in advance. Let $G_\lambda$ denote the graph obtained from G by subtracting $\lambda^*$ from every edge weight. The minimum cycle mean $\lambda^*$ is the largest value of $\lambda$ for which $G_\lambda$ has no negative cycles.

According to an embodiment of the invention, an exemplary, non-limiting algorithm for performing a minimum mean cycle optimization is Howard's algorithm. Given a graph G=(V, E) having n nodes and m edges, Howard's algorithm computes i on a policy graph, a subgraph of G where the out-degree of each node is exactly one. Note that the policy graph has n edges. For a given $\lambda$ the algorithm attempts to find the shortest paths from every node to a chosen node u. In doing so, it either discovers that the shortest paths are well defined in which case the correct $\lambda$ has been found or it discovers a negative cycle in $G_\lambda$. In the latter case, the negative cycle has a smaller mean weight than the current $\lambda$. In this case, $\lambda$ can be updated to the mean weight of the new cycle and the process continues.

Pseudo-code for Howard's algorithm is as follows.

```
Input: digraph G = (V,E)
for each node u in V do d(u) = +∞
for each edge (u, v) in E do
    if w(u, v) < d(u) then do
        d(u) = w(u, v);
        π(u) = v; // policy
    end
end
while (true) do // Main loop - Iterate
    // Find the set E_π of policy edges
    E_π ={(u, π(u)) in E}
    // Compute λ in the policy graph G_π
    Examine every cycle in G_π = (V, E_π)
    Let C be the cycle with the smallest mean in G_π
    λ =w(C)/|C|
    Select an arbitrary node u in C
    // Compute the node distances using the reverse BFS
    if (there exists path from v to u in G_π ) then
        d(v) = d(π(v)) + w(v, π(v)) - λ
    end
    //Improve the node distances
    improved = false
    for each edge (u, v) in E do
        δ(u) = d(u) - (d(v) + w(u,v) - λ
        if δ(u)>0 then
            if δ(u)>ε then improved = true end
            d(u) = d(v) + w(u,v) - λ
            π(u) = v
        end
    end
    // If not much improvement in the node distances, exit
    if (NOT improved) then return λ
end
```

A difference between a method according to an embodiment of the invention and a traditional graph representation is adapting a multi-scale mean-shift based edge detection to cyclic graphs. In traditional graph based representations, graph edge costs are computed as functions of the image gradients. Such image gradients are often computed by taking the intensity differences of pixels corresponding to two vertices of the edge, which assumes that the structure boundaries are in the form of isolated step edges. However, in reality, diffuse edges, low contrast edges and gap edges occur frequently, even in a single cross-sectional vessel boundary. The robust and accurate detection of edges from these intensity profiles requires edge detection on many length scales, achievable by multi-scale mean-shift based edge detection.

Another difference between a method according to an embodiment of the invention and a traditional graph representation is in the selection of the gradient direction. Specifically, in traditional methods, the edge cost cannot be computed orthogonal to the boundary of interest due to the lack of implicit object representation. However, the existence of a seed point in an algorithm according to an embodiment of the invention implicitly defines the inner part of the structure, thus a gradient computation can be performed orthogonal to the edges. In other words, we simply take a sample from the ray orthogonal to the edge and perform multi-scale edge detection along this ray. Then the inverse of a multi-scale edge response is considered for the weight of that edge.

An algorithm according to an embodiment of the invention based on a minimum-mean cycle optimization using multi-scale mean-shift edge responses on a cyclic graph, is suitable for computing vessel cross-sectional boundaries for several reasons. First, it always returns a single closed and smooth contour, which is consistent with the typical vessel boundary. Second, missing edges on the vessel boundary, such as those due to the nearby vessels, are naturally closed by smooth contour segments i.e., elliptical segments. Third, there is no significant preference for contours based on their size since a mean cost is computed. Most graph-cut based algorithms prefer small contour segments over large ones, thus often resulting in errors. Fourth, an algorithm according to an embodiment of the invention is computationally efficient. Finally, the accuracy of the results is independent of the location of the seed point.

3D Coronary Construction

In general, for accurate quantification of coronary pathologies, sub-voxel accuracy is required in segmentation results and centerline representations. However, vessel analysis algorithms typically produce discrete vessel maps and the corresponding centerline models are computed from them. The accuracy of these centerline models is affected by the quality of the segmentation results. In the case of coronary arteries, even very accurate discrete segmentation is insufficient for obtaining good centerline models because the accuracy of discrete centerline detection algorithms cannot be reduced below pixel level, which may correspond to large area in a small vessel.

Figure 5:
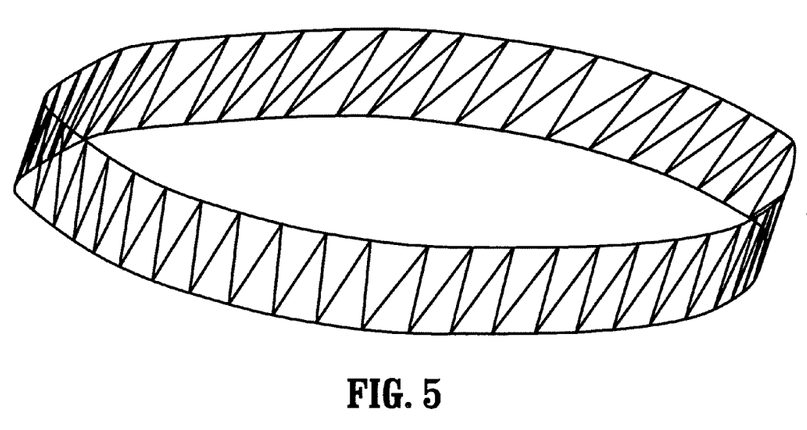
FIG. 5 depicts triangulation between two successive contours, according to an embodiment of the invention.

A two step algorithm according to an embodiment of the invention can improve the accuracy of centerline models and construct accurate 3D geometric coronary models. Specifically, referring again to FIG. 1a, first, at step 122, sub-voxel accurate coronary vessel cross-sectional boundaries are constructed along several locations of a given approximate centerline model. These sub-voxel accurate can be initialized from the vessel boundaries previously detected. Second, at step 124, a centerline model is reconstructed from the centers of these 2D contours, which results in a more accurate centerline model. The accuracy of centerlines is further improved by iteratively applying these steps at step 126. This iterative 2D boundary detection and centerline refinement algorithm according to an embodiment of the invention terminates when the centerline points cease to substantially change, that is, when convergence is satisfied. This iterative refinement is applied to each 2D boundary. A 3D coronary triangulated surface model, also known as a mesh, is then constructed at step 128 from these 2D contours. Starting with successive contours, that is, cross-sectional boundaries, one boundary is sampled and the corresponding points on the other contour are located, from which a local triangulation surface is constructed. Each point is connected to the two closest points on the other contour to form a tubular mesh. FIG. 5 depicts triangulation between two successive contours, according to an embodiment of the invention.

Note that branch points requires special handling. Specifically, cross-sectional models might intersect with each other at branches. One solution according to an embodiment of the invention is to take the union of intersecting surfaces.

Integration of the 3D Vessel Segmentation and Visualization

The segmentation generated tubular mesh is then rendered from a user specified orientation using the less-than Z-buffer function. The Z-buffer function calculates the distance from a viewer eye to every surface point in a scene, such as a 3D image volume, and it is updated for every change in the rendering parameters such as, the viewing direction, location of object(s) or the location of the viewer (or camera). The Z-buffer function can be set to provide the distance from the viewer to the closest or the farthest surface points. It is used to calculate which surfaces are visible and which are hidden, i.e. located behind another surface, from a given point of view.

There are several options to define the Z-buffer function: LESS_THAN, LESS_EQUAL, GREATER_THAN, and GREAT EQUAL. These options specify the mathematical operation that the function will perform between the current value in the Z-buffer and the computed distance to the currently processed (rendered) point. That is, a less-than function means that during the rendering of the scene, the distance from the viewer to every processed (rendered) point is compared to the value already in the Z-buffer. If the distance to the currently processed point is less-than the value already in the Z-buffer, this value will be replaced in the z-buffer. The result is that the Z-buffer will have the shortest distances to the surface points.

Figure 1B:
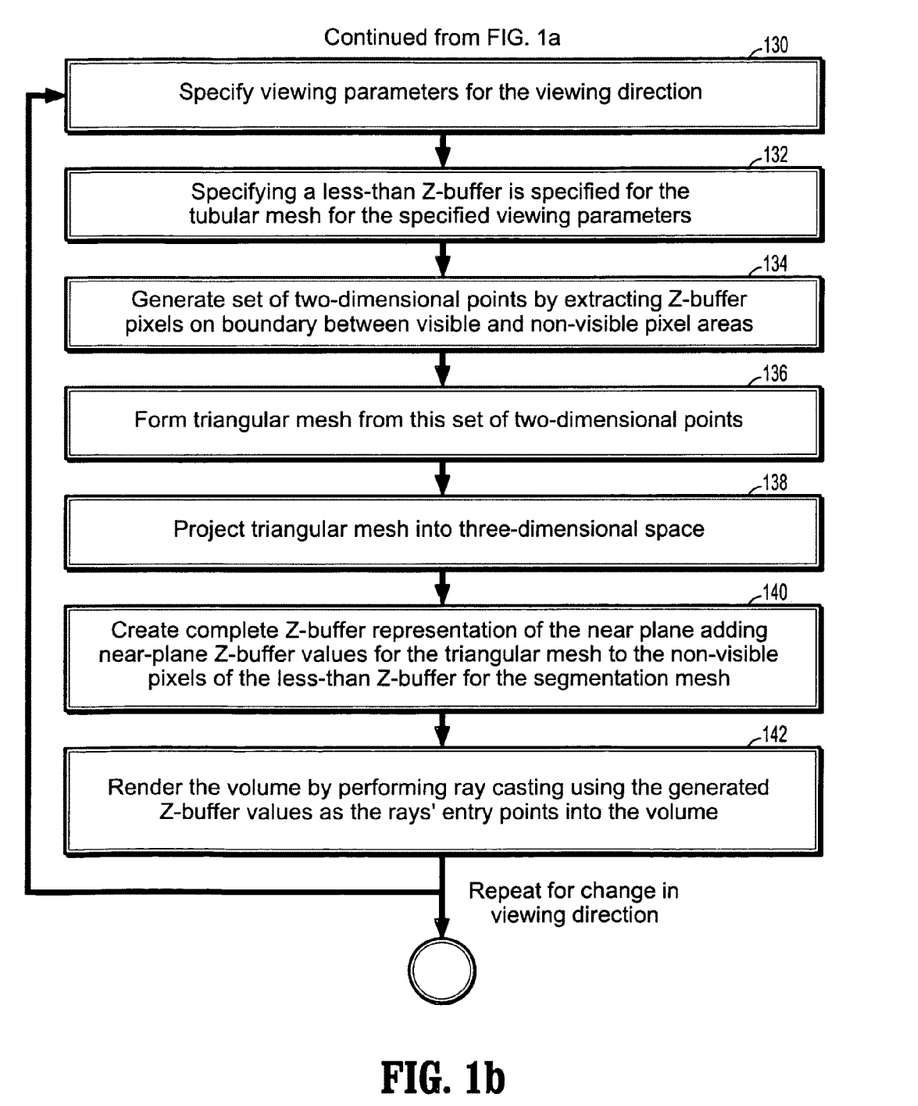

A flowchart of a visualization algorithm according to an embodiment of the invention for multi-branched coronary vessels is depicted in FIG. 1b. Referring now to the figure, first, at step 130, viewing parameters are specified that correspond to a viewing direction. At step 132, a less-than Z-buffer is calculated for the tubular mesh from step 128 for the specified viewing parameters such that every visible pixel in the resulting Z-buffer specifies the distance, along the viewing direction, from the viewer to the nearest visible part of the tubular mesh. Pixels in areas where there is no mesh surface to visualize, called non-visible pixels, will have a pre-defined background value. An exemplary, non-limiting background value is one. This Z-buffer is saved for later use.

A set of two-dimensional points is generated at step 134 by extracting all Z-buffer pixels that are on the boundary between visible and non-visible pixel areas. The visibility of a point can be determined based on its Z-buffer value. For every visible pixel in the Z-buffer, one checks whether or not all its 8 neighboring pixels are visible. If all the neighbors are visible, skip to the next pixel. If there is at least one non-visible neighbor, mark this pixel as the boundary between visible and non-visible pixels. Four additional points are added at the corners of the Z-buffer according to a desired bounding box of the area or image size to be visualized, to see the surrounding area around the vessels. The added four points serve to expand the 2D set to an area or bounding box around the vessels. A triangular mesh is generated at step 136 from this set of two-dimensional points. An exemplary, non-limiting method of generating a mesh is Delaunay triangulation.

The generated two-dimensional triangular mesh is then projected at step 138 into three-dimensional space by adding to each point its Z coordinate calculated from the corresponding less-than Z-buffer value previously saved and the known model-view transformation of the specific viewing direction. This three-dimensional triangular surface mesh can be rendered from the current viewing direction and the near plane Z-buffer is saved, using the less-than Z-buffer function.

A complete Z-buffer representation of the near plane is created at step 140 by adding to the non-visible pixels of the less-than Z-buffer calculated for segmentation mesh previously saved, the corresponding near-plane Z-buffer values from the mesh rendered in the previous step. The result is a complete near plane representation of the original tubular mesh structure and its surrounding area, incorporating smooth interpolated changes of the depth (Z-value) from the segmentation mesh to the nearby surrounding area. An optional additional smoothing can be performed by applying a Gaussian blur filter to the generated Z-buffer.

The final step is to perform ray casting volume rendering at step 142, calculating the rays starting points and their direction from the generated Z-buffer values as the rays' entry points into the volume, and the specified viewing direction. According to one embodiment of the invention, the rays can be propagated to some specified depth in the volume. Alternatively, according to another embodiment of the invention, a far Z-plane can be similarly generated to provide an exit point for each ray. This method can be used with different types of volume rendering, such as, Maximal Intensity Projection (MIP), volume render without shading, or shaded volume rendering. Steps 130, 132, 134, 136, 138, 140, and 142 can repeated for changes in the viewing parameters, such as those resulting from a change in viewing direction.

Mean-Shift Filtering

According to another embodiment of the invention, the rendering can be performed using the voxels' calculated mean-shift values instead of the voxel intensities. The rendering can show the mean shift values on the surface of the model, on the center line, accumulated values along the rendering ray, or the maximal value found along the rendering ray.

Given the set $[x_i]$ of n d-dimensional points, the mean shift vector is also a d-dimensional vector whose components are computed at a location x by $$M_h(x) = \frac{\sum_{i=1}^{n} x K\left(\frac{x - x_i}{h}\right)}{\sum_{i=1}^{n} K\left(\frac{x - x_i}{h}\right)} - x$$

where K represents a kernel with a monotonically decreasing profile and h is the bandwidth of the kernel. This equation represents an estimate of the normalized density gradient computed at location x. The mean shift vector always points towards the direction of the maximum increase in the density. As a result, the successive computation of this expression, followed by the translation of the kernel K by $M_h(x)$ will define a path that converges to a local maximum of the underlying density. This technique is known as the mean shift procedure, a simple and efficient statistical technique for mode detection.

The mean shift procedure can be applied for the data points in the joint spatial-range domain, where the space of the 2-dimensional lattice represents the spatial domain and the space of intensity values constitutes the range domain. In this approach, a data point defined in the joint spatial-range domain is assigned with a point of convergence which represents a local mode of the density in this space, e.g., a 3-dimensional space for gray level images. In other words, the intensity value at each location can be replaced with the local intensity of the mode obtained from the mean shift filtering technique.

Recall that a surface model according to an embodiment of the invention is represented by triangles which are determined from the successive 2D cross-sectional boundary models. The mean-shift value of a triangle can be determined from the average value of the mean-shift values at the three corners. Since these corners correspond to locations in the 2D cross-sectional boundary models, a 1D mean-shift computation at such locations would be sufficient for determining the mean shift value of a triangle, and thus, the surface model.

Ribbon Multi-Planar-Reconstruction (MPR) Rendering

An embodiment of the invention includes a method of visualizing the coronaries using a Ribbon Multi-Planar-Reconstruction (MPR) rendering. According to one embodiment of the invention, for every point along the centerline, values are interpolated along a line parallel to the viewing direction in the width of the vessel's model at that point. According to another embodiment of the invention, a specified line width, usually the maximal width along all the centerline models, can be used. This will create a ribbon like display of the coronaries along the centerlines.

Knowing the precise location in 3D for each edge of these MPR lines, these points can be used as the set of points on the boundary between visible and non-visible pixel areas. A same method as described above can expand the ribbon MPR and fill the surrounding area between the ribbon parts with interpolated data from surrounding neighbors. As mentioned above, either the voxels gray scale values or their calculated mean-shift values can be used for the visualization.

Figure 7:
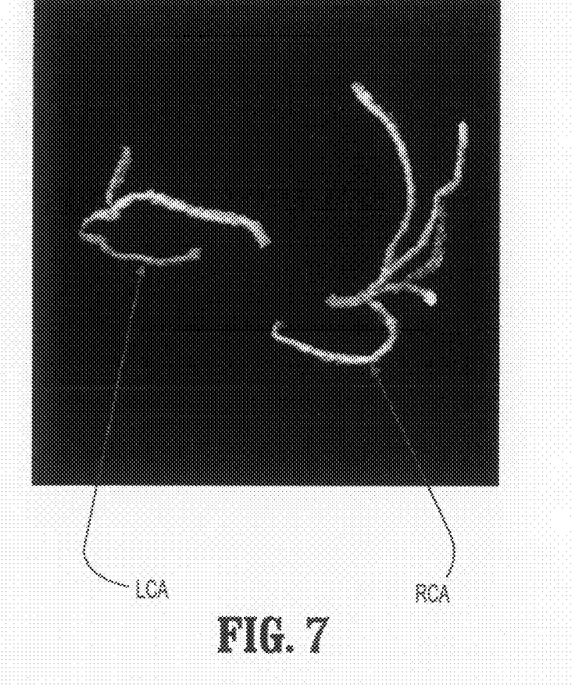
FIGS. 7-9 depict examples of rendered coronary arteries, according to an embodiment of the invention.
Figure 8:
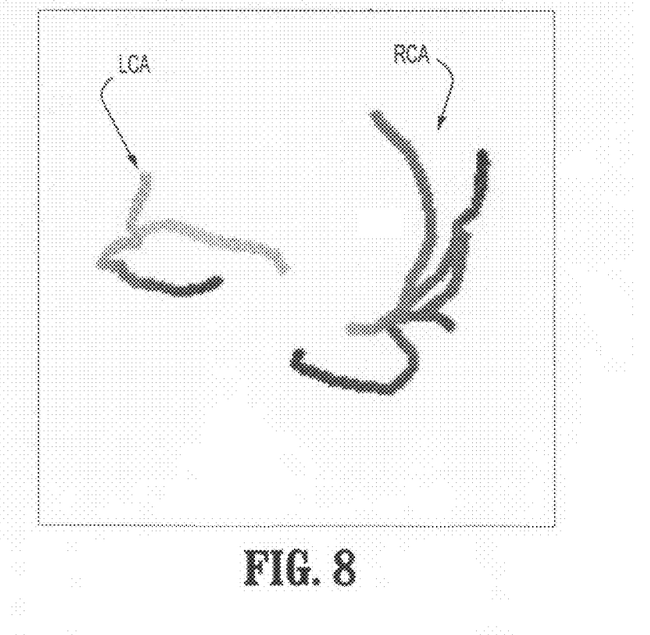
Figure 9:
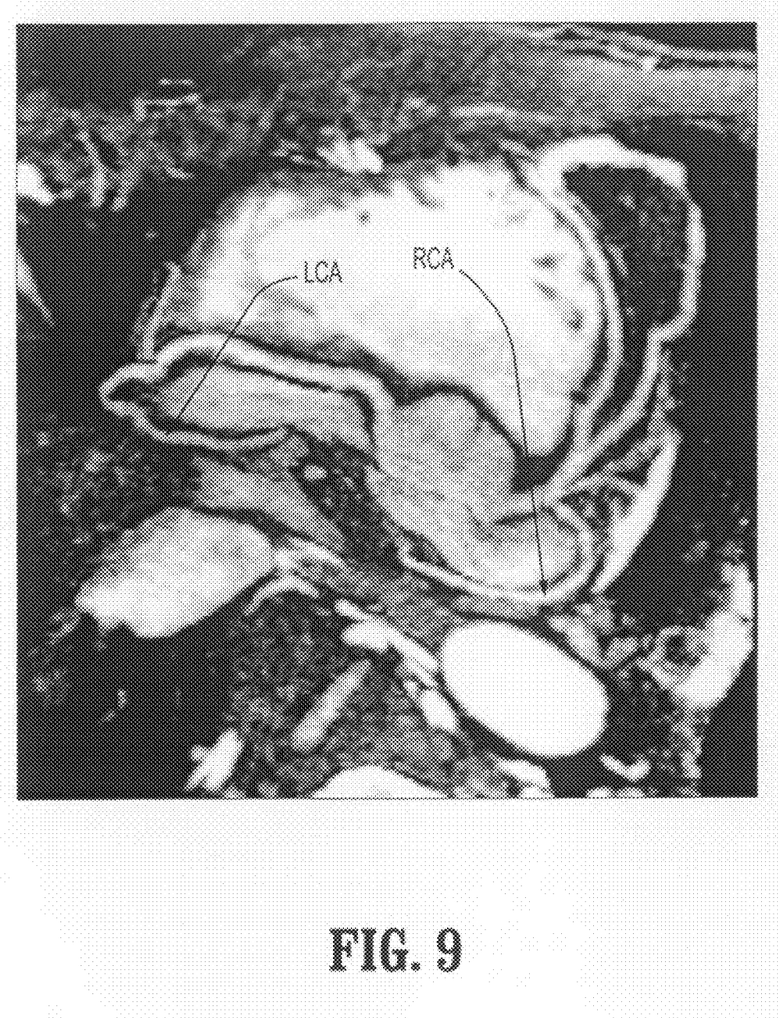

Examples of rendered coronary arteries are shown in FIGS. 7-9. FIG. 7 shows a rendered image of 2 coronary arteries, the left coronary artery (LCA) and right coronary artery (RCA), without the surrounding area. FIG. 8 shows the near plane depth information, taken from the Z-buffer of the rendered coronary arteries of FIG. 7. Note that darker shaded regions re closer to the viewer, while lighter shaded regions are farther away. FIG. 9 shows the projected arteries LCA and RCA in one image within the rendered context of their surrounding area.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
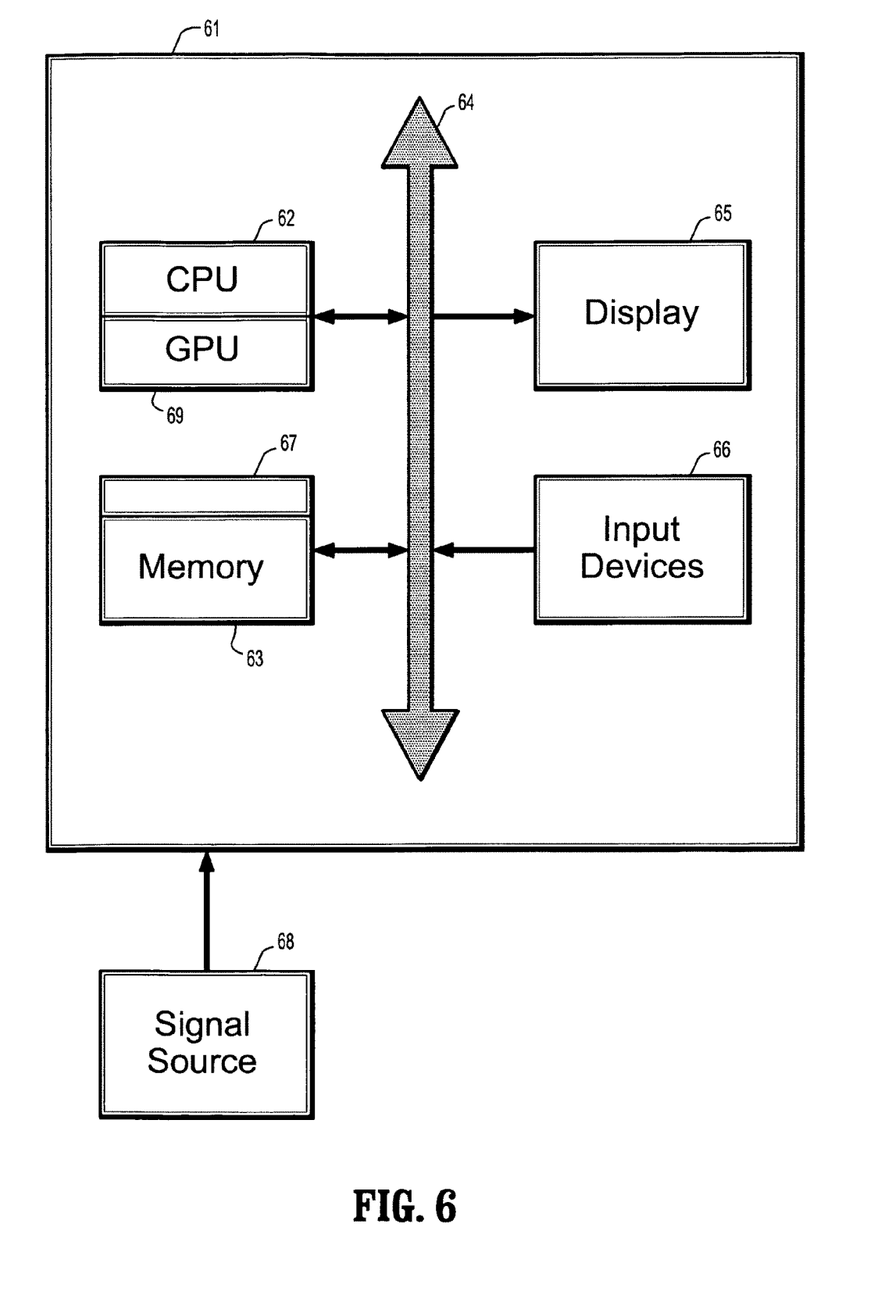
FIG. 6 is a block diagram of an exemplary computer system for implementing a method for visualization and segmentation of multi-branched coronary vessels, according to an embodiment of the invention.

FIG. 6 is a block diagram of an exemplary computer system for implementing a method for visualization and segmentation of multi-branched coronary vessels, according to an embodiment of the invention. Referring now to FIG. 6, a computer system 61 for implementing the present invention can comprise, inter alia, a central processing unit (CPU) 62, graphics processing unit (GPU) 69, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 and/or GPU 69 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of coronary vessel segmentation and visualization, the method performed by the computer comprising the steps of:

providing a digitized coronary image, said image comprising a plurality of intensities associated with a 3-dimensional grid of voxels;

placing a plurality of seed points along an estimated centerline of a coronary vessel;

selecting a seed point and constructing a cyclic graph around said seed point in a plane perpendicular to the centerline at the seed point;

performing a multi-scale-mean shift filtering in said perpendicular plane to estimate image gradient values;

detecting a boundary of said vessel using a minimum-mean-cycle optimization that minimizes a ratio of a cost of a cycle in said graph to a length of said cycle;

constructing a sub-voxel accurate vessel boundary about a point on said centerline; and refining the location of said centerline point from said sub-voxel accurate boundary, wherein said steps of constructing a sub-voxel accurate vessel boundary and refining the centerline point location are repeated until convergence;

constructing a 3-dimensional triangulated surface model from said sub-voxel accurate vessel boundaries to form a tubular mesh representing said coronary vessel; and rendering the tubular mesh from a viewer-specified direction by specifying a less-than Z-buffer for said tubular mesh wherein every visible point in the resulting Z-buffer specifies the distance, along a viewing direction, from a viewer to a nearest visible part of the tubular mesh:

generating a set of two-dimensional points by extracting all Z-buffer points that are on a boundary between visible and non-visible parts of the tubular mesh;

generating a triangular mesh from said set of two-dimensional points;

projecting the triangular mesh into a 3-dimensional space adding to each point of said mesh a Z coordinate calculated from a corresponding less-than Z-buffer function value and a known model-view transformation of the specific viewing direction;

creating a complete Z-buffer representation of the projected 3-dimensional triangular mesh representing said vessels by adding near-plane Z-buffer values of the projected 3-dimensional triangular mesh to corresponding non-visible points of the less-than Z-buffer function; and volume rendering said 3-dimensional triangular mesh by calculating ray starting points and direction from the complete Z-buffer values and the specified viewing direction.

2. The method of claim 1, wherein said steps of selecting a seed point and constructing a cyclic graph, estimating image gradient values, and detecting a vessel boundary are repeated for each of the plurality of seed points.

3. The method of claim 2, wherein constructing a 3-dimensional triangulated surface model comprises, for each successive vessel boundary, sampling one boundary, locating corresponding points on a next boundary, and constructing a triangulated surface by connecting each point on the sampled boundary to two closest points on the next boundary.

4. The method of claim 1, wherein constructing a cyclic graph around said seed point comprises disposing an array of nodes are disposed at step at equally spaced angular intervals about each one of a circumference of plurality of concentric circles centered at the seed point; and for each node in said graph, extending a plurality of edges to other nodes in said graph, wherein an angle of each edge termination node with respect to the seed point is greater than the angle of the edge origination node with respect to the seed point.

5. The method of claim 4, wherein the plurality of edges comprises 3 edges.

6. The method of claim 1, wherein performing a multi-scale-mean shift filtering comprises propagating one or more rays along the vessel, representing each ray as a collection of 2-dimensional points, performing a mean-shift filtering to each 2D points until convergence, selecting a plurality of edges based on a confidence function of said mean-shift filter size, and eliminating incorrect edges.

7. The method of claim 6, wherein said confidence function for a filter scale $\sigma_{xk}$ at a point i is given by:

$$E_{ci}(\sigma_{xk}) = \frac{\sum_{j=1}^{M} \frac{|I_j^* - I_i|}{|I_c - I_i|}}{M}$$

where M is a size of the filter, $I_j^k$ is a smoothed intensity at j, and $I_c$ corresponds to the intensity value of the mean-shift convergence point.

8. The method of claim 6, wherein eliminating incorrect edges comprises eliminating those edges with a small confidence value.

9. The method of claim 1, wherein the rays are propagated to a specified depth in the 3-dimensional triangular mesh.

10. The method of claim 1, further comprising generating a far Z-plane to provide an exit point for each ray.

11. The method of claim 1, wherein extracting all Z-buffer points that are on a boundary between visible and non-visible parts of the tubular mesh comprises checking, for every visible point in the Z-buffer, whether or not all neighboring points are visible, skipping to a next pixel if all the neighbors are visible, otherwise if there is at least one non-visible neighbor point, mark this point as a boundary between visible and non-visible points: and adding additional points at corners of the Z-buffer according to a desired bounding box of an image area to be visualized.

12. The method of claim 1, wherein said volume rendering is performed using calculated mean-shift values of each point in said mesh, wherein an intensity value at each point is replaced with a local intensity of a mode obtained from the mean shift computation, wherein a mean-shift value of a triangle in said mesh is determined from an average value of the mean-shift values at the corners computed from a 1D mean-shift computation at each location.

13. A computer-implemented method of coronary vessel segmentation and visualization, the method performed by the computer comprising the steps of:

providing a digitized coronary image, said image comprising a plurality of intensities associated with a 3-dimensional grid of voxels;

constructing a plurality of vessel boundaries about seed points along an estimated centerline of a coronary vessel;

constructing a sub-voxel accurate vessel boundaries from said vessel boundaries;

refining the location of said centerline point from said sub-voxel accurate boundary, wherein said steps of constructing a sub-voxel accurate vessel boundary and refining the centerline point location are repeated until convergence;

constructing a 3-dimensional triangulated surface model from said sub-voxel accurate vessel boundaries to form a tubular mesh representing said coronary vessel;

specifying a less-than Z-buffer for said tubular mesh wherein every visible, point in the resulting Z-buffer specifies the distance, along a viewing direction, from a viewer to a nearest visible part of the tubular mesh;

generating a set of two-dimensional points by extracting all Z-buffer points that are on a boundary between visible and non-visible parts of the tubular mesh;

generating a triangular mesh from said set of two-dimensional points;

projecting the triangular mesh into a 3-dimensional space by adding to each point of said mesh a Z coordinate calculated from a corresponding less-than Z-buffer function value and a known model-view transformation of the specific viewing direction; and creating a complete Z-buffer representation of the projected 3-dimensional triangular mesh representing said vessels by adding near-plane Z-buffer values of the projected 3-dimensional triangular mesh to corresponding non-visible points of the less-than Z-buffer function.

14. The method of claim 13, further comprising volume rendering said 3-dimensional triangular mesh by calculating ray starting points and direction from the complete Z-buffer values and the specified viewing direction.

15. The method of claim 13, wherein constructing a plurality of vessel boundaries comprises:

placing a plurality of seed points along said estimated centerline of said coronary vessel;

selecting a seed point and constructing a cyclic graph around said seed point in a plane perpendicular to the centerline at the seed point;

performing a multi-scale-mean shift filtering in said perpendicular plane to estimate image gradient values; and detecting a boundary of said vessel using a minimum-mean-cycle optimization that minimizes a ratio of a cost of a cycle in said graph to a length of said cycle, wherein said steps of selecting a seed point and constructing a cyclic graph, estimating image gradient values, and detecting a vessel boundary are repeated for each of the plurality of seed points.

16. The method of claim 13, further comprising performing a Ribbon Multi-Planar-Reconstruction (MPR) rendering, wherein for each point along the centerline, interpolating values of points along a line parallel to a viewing direction in a width of the vessel's boundary, using said points as a boundary between visible and non-visible regions of said vessel, and filling a surrounding area with interpolated data from surrounding points.

17. The method of claim 16, wherein said ribbon MPR is calculated using image intensity values.

18. The method of claim 16, wherein said ribbon MPR is calculated using mean-shift values of each point in said mesh, wherein an intensity value at each point is replaced with a local intensity of a mode obtained from the mean shift computation, wherein a mean-shift value of a triangle in said mesh is determined from an average value of the mean-shift values at the corners computed from a 1D mean-shift computation at each location.

19. A program storage device readable by a computer, tangibly embodying a program of instructions executable by the computer to perform the method steps for coronary vessel segmentation and visualization, said method comprising the steps of:
providing a digitized coronary image, said image comprising a plurality of intensities associated with a 3-dimensional grid of voxels;
placing a plurality of seed points along an estimated centerline of a coronary vessel;
selecting a seed point and constructing a cyclic graph around said seed point in a plane perpendicular to the centerline at the seed point;
performing a multi-scale-mean shift filtering in said perpendicular plane to estimate image gradient values;
detecting a boundary of said vessel using a minimum-mean-cycle optimization that minimizes a ratio of a cost of a cycle in said graph to a length of said cycle;
constructing a sub-voxel accurate vessel boundary about a point on said centerline;
refining the location of said centerline point from said sub-voxel accurate boundary, wherein said steps of constructing a sub-voxel accurate vessel boundary and refining the centerline point location are repeated until convergence;
constructing a 3-dimensional triangulated surface model from said sub-voxel accurate vessel boundaries to form a tubular mesh representing said coronary vessel, and
rendering the tubular mesh from a viewer-specified direction by specifying a less- than Z-buffer for said tubular mesh wherein every visible point in the resulting Z-buffer specifies the distance, along a viewing direction, from a viewer to a nearest visible part of the tubular mesh;
generating a set of two-dimensional points by extracting all Z-buffer points that are on a boundary between visible and non-visible parts of the tubular mesh;
generating a triangular mesh from said set of two-dimensional points:
projecting the triangular mesh into a 3-dimensional space by adding to each point of said mesh a Z coordinate calculated from a corresponding less-than Z-buffer function value and a known model-view transformation of the specific viewing direction:
creating a complete Z-buffer representation of the projected 3-dimensional triangular mesh representing said vessels by adding near-plane Z-buffer values of the projected 3-dimensional triangular mesh to corresponding non-visible points of the less-than Z-buffer function; and
volume rendering said 3-dimensional triangular mesh by calculating ray starting points and direction from the complete Z-buffer values and the specified viewing direction.

20. The computer readable program storage device of claim 19, wherein said steps of selecting a seed point and constructing a cyclic graph, estimating image gradient values, and detecting a vessel boundary are repeated for each of the plurality of seed points.

21. The computer readable program storage device of claim 20, wherein constructing a 3-dimensional triangulated surface model comprises, for each successive vessel boundary, sampling one boundary, locating corresponding points on a next boundary, and constructing a triangulated surface by connecting each point on the sampled boundary to two closest points on the next boundary.

22. The computer readable program storage device of claim 19, wherein constructing a cyclic graph around said seed point comprises disposing an array of nodes are disposed at step at equally spaced angular intervals about each one of a circumference of plurality of concentric circles centered at the seed point; and for each node in said graph, extending a plurality of edges to other nodes in said graph, wherein an angle of each edge termination node with respect to the seed point is greater than the angle of the edge origination node with respect to the seed point.

23. The computer readable program storage device of claim 22, wherein the plurality of edges comprises 3 edges.

24. The computer readable program storage device of claim 19, wherein performing a multi-scale-mean shift filtering comprises propagating one or more rays along the vessel, representing each ray as a collection of 2-dimensional points, performing a mean-shift filtering to each 2D points until convergence, selecting a plurality of edges based on a confidence function of said mean-shift filter size, and eliminating incorrect edges.

25. The computer readable program storage device of claim 24, wherein said confidence function for a filter scale $\sigma_{xk}$ at a point i is given by:

$$E_{ci}(\sigma_{xk}) = \frac{\sum_{j=1}^{M} \frac{|I_j^* - I_i|}{|I_c - I_i|}}{M}$$

where M is a size of the filter, $I_j^k$ is a smoothed intensity at j, and $I_c$ corresponds to the intensity value of the mean-shift convergence point.

26. The computer readable program storage device of claim 24, wherein eliminating incorrect edges comprises eliminating those edges with a small confidence value.

27. The computer readable program storage device of claim 19, wherein the rays are propagated to a specified depth in the 3-dimensional triangular mesh.

28. The computer readable program storage device of claim 19, the method further comprising generating a far Z-plane to provide an exit point for each ray.

29. The computer readable program storage device of claim 19, wherein extracting all Z-buffer points that are on a boundary between visible and non-visible parts of the tubular mesh comprises checking, for every visible point in the Z-buffer, whether or not all neighboring points are visible, skipping to a next pixel if all the neighbors are visible, otherwise if there is at least one non-visible neighbor point, mark this point as a boundary between visible and non-visible points; and adding additional points at corners of the Z-buffer according to a desired bounding box of an image area to be visualized.

30. The computer readable program storage device of claim 19, wherein said volume rendering is performed using calculated mean-shift values of each point in said mesh, wherein an intensity value at each point is replaced with a local intensity of a mode obtained from the mean shift computation, wherein a mean-shift value of a triangle in said mesh is determined from an average value of the mean-shift values at the corners computed from a 1D mean-shift computation at each location.

* * * * *